United States Patent
Kang

(10) Patent No.: US 10,388,936 B2
(45) Date of Patent: Aug. 20, 2019

(54) SECONDARY BATTERY AND METHOD OF MANUFACTURING THE SAME

(71) Applicant: Samsung SDI Co., Ltd., Yongin-si, Gyeonggi-do (KR)

(72) Inventor: Shingun Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/547,921

(22) Filed: Nov. 19, 2014

(65) Prior Publication Data
US 2015/0243955 A1    Aug. 27, 2015

(30) Foreign Application Priority Data
Feb. 27, 2014    (KR) .................. 10-2014-0023695

(51) Int. Cl.
*H01M 2/30* (2006.01)
*H01M 2/04* (2006.01)
*H01M 2/22* (2006.01)

(52) U.S. Cl.
CPC ............ *H01M 2/30* (2013.01); *H01M 2/0473* (2013.01); *H01M 2/22* (2013.01)

(58) Field of Classification Search
CPC .................................. H01M 2/06; H01M 2/08
USPC .................................. 429/174, 180; 29/623.1
See application file for complete search history.

(56) References Cited

U.S. PATENT DOCUMENTS

| | | | |
|---|---|---|---|
| 2006/0236739 A1* | 10/2006 | Smith | B21J 15/027 72/67 |
| 2007/0154802 A1* | 7/2007 | Uh | H01M 2/0404 429/180 |
| 2010/0136415 A1 | 6/2010 | Ahn et al. | |

(Continued)

FOREIGN PATENT DOCUMENTS

| | | |
|---|---|---|
| CN | 101383431 A | 3/2009 |
| EP | 1 662 601 A1 | 5/2006 |

(Continued)

OTHER PUBLICATIONS

Valley Fastner Group, Shoulder Rivets, Jun. 2012, http://www.valleyfastner.com/shoulder-rivets.html.*

(Continued)

*Primary Examiner* — Sarah A. Slifka
*Assistant Examiner* — Brian R Ohara
(74) *Attorney, Agent, or Firm* — Knobbe, Martens, Olson & Bear, LLP

(57) ABSTRACT

A secondary battery is disclosed. In one aspect, the secondary battery includes an electrode assembly including a first electrode plate, a second electrode plate and a separator. The secondary battery also includes a case having an opening and housing the electrode assembly and an electrolytic solution. The secondary battery further includes a cap assembly including a cap plate, an insulation plate, a terminal plate and an electrode terminal. The electrode terminal includes a body having a first thickness and a tail. At least a portion of the tail of the electrode terminal has a second thickness that is less than the first thickness and the body of the electrode terminal is connected to the tail of the electrode terminal at a junction, a cross-section of the junction defining a rounded edge.

11 Claims, 4 Drawing Sheets

(56) References Cited

U.S. PATENT DOCUMENTS

| | | | |
|---|---|---|---|
| 2011/0052970 A1* | 3/2011 | Kurata | H01M 2/0404 |
| | | | 429/158 |
| 2011/0244310 A1* | 10/2011 | Kim | H01M 2/0212 |
| | | | 429/158 |
| 2011/0250489 A1* | 10/2011 | Baek | F16B 25/0021 |
| | | | 429/163 |
| 2011/0294001 A1* | 12/2011 | Byun | H01M 2/06 |
| | | | 429/181 |
| 2012/0308877 A1 | 12/2012 | Hirai | |
| 2013/0130100 A1* | 5/2013 | Kurata | H01M 2/024 |
| | | | 429/179 |
| 2013/0224536 A1* | 8/2013 | Hattori | H01M 2/30 |
| | | | 429/61 |
| 2014/0227581 A1* | 8/2014 | Ohta | H01M 2/06 |
| | | | 429/158 |
| 2014/0242440 A1* | 8/2014 | Yamada | H01M 2/305 |
| | | | 429/121 |

FOREIGN PATENT DOCUMENTS

| | | | | |
|---|---|---|---|---|
| JP | 2009-054531 (A) | | 3/2009 | |
| JP | 2009-080975 (A) | | 4/2009 | |
| JP | 2009080975 A | * | 4/2009 | H01M 2/06 |
| JP | 2009087729 A | * | 4/2009 | |
| JP | 2010-277785 A | | 12/2010 | |
| JP | WO 2013030869 A1 | * | 3/2013 | H01M 2/06 |
| JP | 2013-093287 (A) | | 5/2013 | |
| KR | 10-2003-0044813 (A) | | 6/2003 | |
| KR | 10-2008-0009462 (A) | | 1/2008 | |
| KR | 10-2008-0013211 (A) | | 2/2008 | |
| WO | WO 2015/059826 A1 | | 4/2015 | |

OTHER PUBLICATIONS

TranslationJP2009080975 (Year: 2018).*
Valley Fastener Group LLC: "Shoulder rivets", Mar. 6, 2012, XP002741482, Retrieved from the Internet: URL:https://web.archive.org/web/20120306134157/http://www.valleyfastener.com/shoulder-rivets.html, entire document.
Extended European Search Report dated Jul. 10, 2015 for European Patent Application No. EP 14 199 063.0, which shares priority of Korean Patent Application No. KR 10-2014-0023695 with captioned U.S. Appl. No. 14/547,921, and cites the above-identified references numbered 1-4.
Chinese Office Action dated May 4, 2018 for Chinese Patent Application No. CN 201510083777.3, which shares priority of Korean Patent Application No. KR 10-2014-0023695 with subject U.S. Appl. No. 14/547,921, and which cites the above-identified reference numbered 1 in addition to other references previously made of record in the subject U.S. Application.
Japanese Office Action dated Jul. 2, 2018 for Japanese Patent Application No. JP 2014-149555, which cites the above-identified references, and which shares priority of Korean Patent Application No. KR 10-2014-0023695 with subject U.S. Appl. No. 14/547,921.
Chinese Office Action dated Jan. 16, 2019 for Chinese Patent Application No. 201510083777.3 which cites the above-identified references numbered 1-2 and which shares priority or Korean Patent Application No. KR 10-2014-0023695 with subject U.S. Appl. No. 14/547,921.
Japanese Office Action dated Apr. 1, 2019 for Japanese Patent Application No. JP 2014-149555, which cites the above-identified references numbered 1 and 2 and which shares priority of Korean Patent Application No. KR 10-2014-0023695 with subject U.S. Appl. No. 14/547,921.

* cited by examiner

SECONDARY BATTERY AND METHOD OF MANUFACTURING THE SAME

CROSS-REFERENCE TO RELATED APPLICATION

This application claims priority to and the benefit of Korean Patent Application No. 10-2014-0023695, filed on Feb. 27, 2014, the entire content of which is incorporated herein by reference.

BACKGROUND

Field

The described technology generally relates to a secondary battery.

Description of the Related Technology

Rechargeable, or secondary, batteries can be charged and discharged in contrast to primary batteries which cannot be recharged. Small secondary batteries are widely used in advanced electronic equipment, e.g., portable phones, and camcorders. Large secondary batteries are widely used for applications such as driving the motors of electric or hybrid cars. The standard secondary battery includes an electrode assembly housed within a case. An electrode terminal is connected through a collector plate and welded to the electrode assembly.

SUMMARY OF CERTAIN INVENTIVE ASPECTS

One inventive aspect is a secondary battery which can reduce contact resistance of an electrode terminal while reducing manufacturing failures.

Another aspect is a secondary battery including an electrode assembly including a first electrode plate, a second electrode plate and a separator, a case accommodating the electrode assembly and an electrolytic solution, and a cap assembly including a cap plate, an insulation plate, a terminal plate and electrode terminals and coupled to a top opening of the case to seal the case, wherein the electrode terminal includes a first insertion part having a first thickness in a region coupled to the terminal plate and a second insertion part having a second thickness smaller than the first thickness.

The electrode terminal may be coupled to the terminal plate in such a manner that a bottom end of the second insertion part is deformed.

The first insertion part may be rounded to have a first curvature radius at its region coupled to the second insertion part.

The first curvature radius of the first insertion part may be greater than or substantially equal to about 0.1 mm.

The second insertion part may be formed such that its bottom end is deformed to have a thickness greater than the second thickness when it is coupled to the terminal plate.

The second insertion part may be rounded to have a second curvature radius at its bottom end.

The second curvature radius of the second insertion part may be greater than or substantially equal to about 0.1 mm.

The first insertion part may have a first length and the second insertion part may have a second length, each of the first and second insertion parts may be coupled to the terminal plate, and the second length may be less than the first length.

The second length may be greater than or substantially equal to about 0.05 mm.

The second insertion part may have a cross-sectional area of greater than or substantially equal to about 20% of a cross-sectional area of the first insertion part.

The second length may be less than or substantially equal to about half of the first length.

The terminal plate may have a terminal through hole passing through its top and bottom surfaces to allow the electrode terminal to be inserted into the terminal through hole, and the terminal through hole may include a first terminal through hole having a first inner diameter on the top surface of the terminal plate and a second terminal through hole having a second inner diameter on the bottom surface of the terminal plate.

The second inner diameter of the second terminal through hole may be greater than the first inner diameter of the first terminal through hole.

The second insertion part of the electrode terminal may be connected to the second terminal through hole of the terminal plate.

Another aspect is a secondary battery comprising an electrode assembly including a first electrode plate, a second electrode plate and a separator; a case having an opening and housing the electrode assembly and an electrolytic solution; and a cap assembly including a cap plate, an insulation plate, a terminal plate and an electrode terminal, wherein the cap assembly seals the opening, wherein the electrode terminal includes a body having a first thickness and a tail having a second thickness less than the first thickness.

The electrode terminal can be electrically connected to the terminal plate, the tail can have upper and lower ends, the upper end can have the second thickness, and the lower end can have a third thickness greater than the second thickness. The body of the electrode terminal can have a first length, the tail of the electrode terminal can have a second length and the second length can be less than the first length. The second length can be greater than or substantially equal to about 0.05 mm. The upper end of the tail of the electrode terminal can have a cross-sectional area that is greater than or substantially equal to about 20% of the cross-sectional area of the body of the electrode terminal. The second length can be less than or substantially equal to about half of the first length. The body of the electrode terminal can be connected to the tail of the electrode terminal at a junction having a rounded edge and the rounded edge of the junction can have a first curvature radius. The first curvature radius can be greater than or substantially equal to about 0.1 mm.

The terminal plate can have a terminal through hole extending from a top surface to a bottom surface thereof, the electrode terminal can be inserted into the terminal through hole, and the terminal through hole can have a first diameter at the top surface of the terminal plate and a second diameter at the bottom surface of the terminal plate. The second diameter can be greater than the first diameter. The tail of the electrode terminal can be connected to the terminal plate and the tail of the electrode terminal can at least partially fill the portion of the terminal through hole having the second diameter.

Another aspect is a method of manufacturing a secondary battery, comprising assembling a cap plate, an insulation plate and a terminal plate so as to form a cap assembly, wherein each of the cap plate, the insulation plate and the terminal plate has a terminal through hole; inserting an electrode terminal into the terminal through holes of the cap assembly, wherein the electrode terminal includes a body and a tail; spinning the electrode terminal so as to spread the tail; and attaching the cap assembly to a case housing an electrode assembly.

The terminal through hole of the terminal plate can include upper and lower sections, the upper section of the terminal through hole can be adjacent to the insulation plate, the upper section of the terminal through hole can have a first diameter, the lower section of the terminal through can have a second diameter, and the second diameter can be greater than the first diameter. The tail of the electrode terminal can be spread in the spinning so as to fill at least a portion of the lower section of the terminal through hole. Before the spinning, the body of the electrode terminal can be connected to the tail of the electrode terminal at a junction having a first rounded edge and the first rounded edge of the junction can have a first curvature radius. The first curvature radius can be greater than or substantially equal to about 0.1 mm. Before the spinning, a bottom end of the tail of the electrode terminal can have a second rounded edge and the second rounded edge can have a second curvature radius. The second curvature radius can be greater than or substantially equal to about 0.1 mm. Before the spinning, the body of the electrode terminal can have a first length, the tail of the electrode terminal can have a second length and the second length can be less than the first length. The second length can be greater than or substantially equal to about 0.05 mm.

As described above, the secondary battery according to at least one embodiment comprises a first insertion part and a second insertion part having a thickness less than that of the first insertion part are formed under electrode terminals to be connected to a terminal plate through a spinning process, thereby providing desired contact resistance while preventing the terminal plate from being damaged by the second insertion part.

Additional aspects and/or advantages of the described technology will be set forth in part in the description which follows and, in part, will be obvious from the description, or may be learned by practice of the described technology.

DETAILED DESCRIPTION OF CERTAIN INVENTIVE EMBODIMENTS

Figure 1:
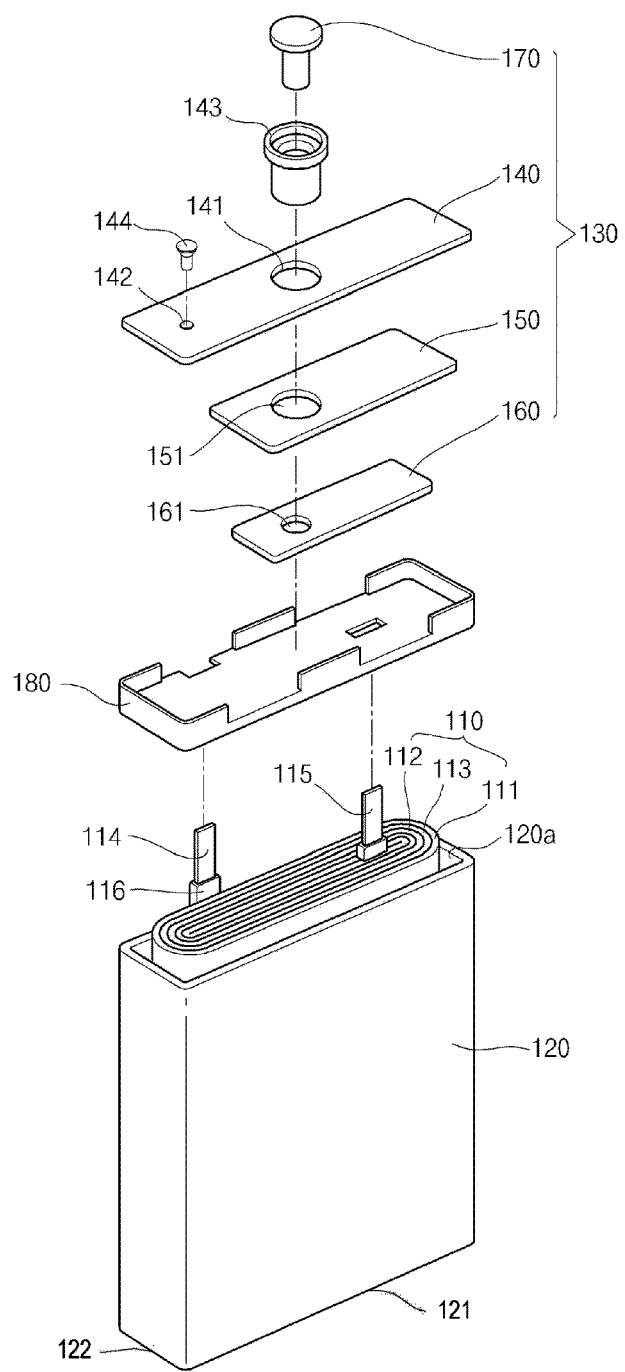
FIG. 1 is an exploded perspective of a secondary battery according to an embodiment.
Figure 2:
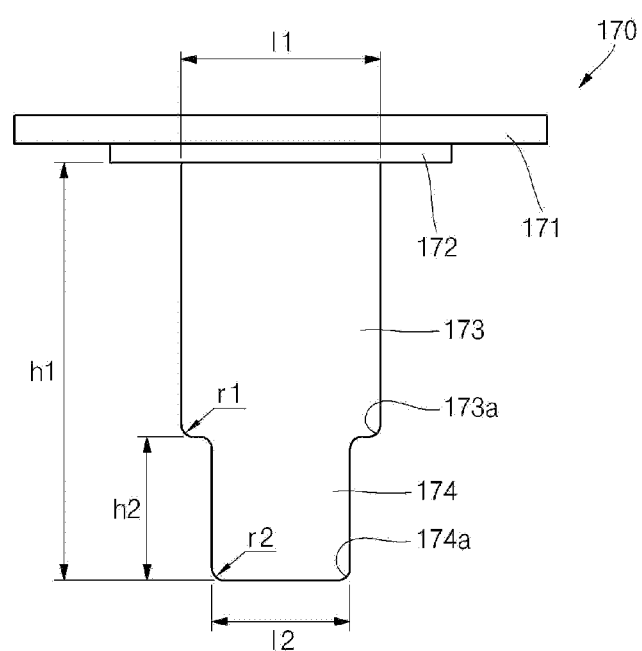
FIG. 2 is a cross-sectional view illustrating the electrode terminal of the secondary battery shown in FIG. 1.
Figure 3A:
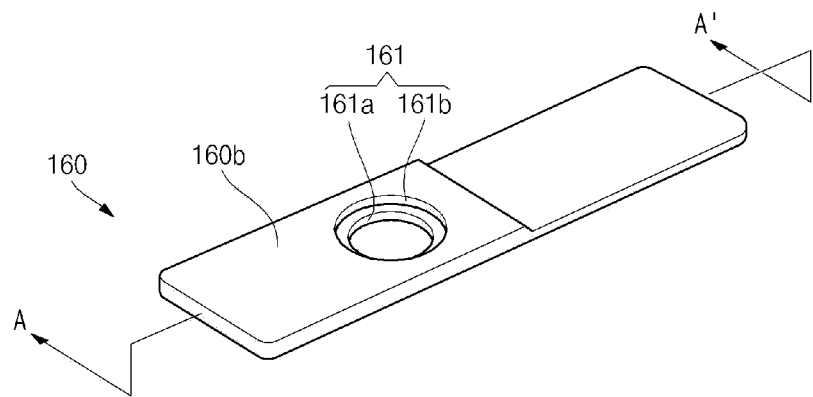
FIG. 3A is a bottom perspective view illustrating the terminal plate of the secondary battery shown in FIG. 1.
Figure 3B:
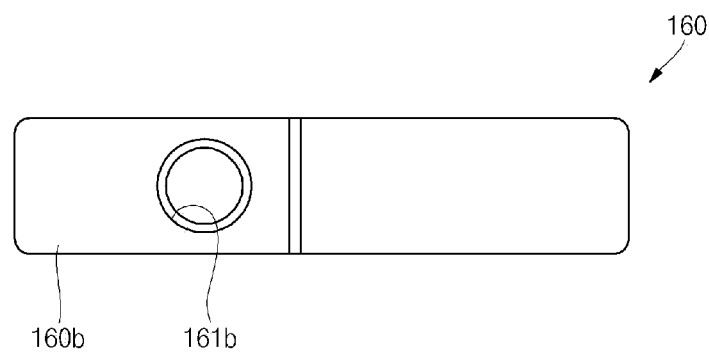
FIG. 3B is a bottom view of the terminal plate shown in FIG. 3A.
Figure 3C:
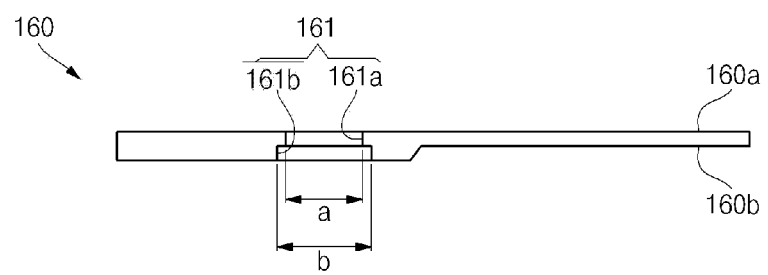
FIG. 3C is a cross-sectional view taken along the line A-A' of FIG. 3A.

Secondary batteries are manufactured to have various shapes such as cylindrical and prismatic shapes. The standard secondary battery is constructed as follows: an electrode assembly is formed by interposing an insulating separator between a positive electrode plate and a negative electrode plate, the electrode assembly is placed in a case together with an electrolyte, and a cap assembly including electrode terminals is attached to the case.

The cap assembly includes a cap plate and a terminal plate each having a terminal through hole and an electrode terminal inserted in the terminal through holes of the cap plate and the terminal plate. An outer periphery of the electrode terminal is wrapped by a gasket.

In the standard cylindrical battery, a top portion of the electrode terminal is rotated and pressed by spinning equipment such as a motor to be fitted into a terminal through hole to be fastened to a terminal plate. However, as the result of the spinning and pressing, the electrode terminal can become tapered so that the contact area between the electrode terminal and the terminal plate is reduced. This increases the resistance between the electrode terminal and the terminal plate, resulting in chronic failures of manufactured secondary batteries.

In addition, as the contact area between the electrode terminal and the terminal plate decreases, the fastening force between the electrode terminal and the terminal plate may be weakened, loosening the terminal plate such that it freely rotates.

Hereinafter, examples of embodiments will be described in detail with reference to the accompanying drawings such that they can easily be made and used by those skilled in the art.

Referring to FIGS. 1 to 5, the secondary battery 100 includes an electrode assembly 110, a case 120, a cap assembly 130 and an insulation case 180.

The electrode assembly 110 includes a positive electrode plate 111, a negative electrode plate 112, and a separator 113 interposed between the positive and negative electrode plates 111 and 112. In some embodiments, the positive electrode plate 111, the negative electrode plate 112 and the separator 113 are wound to have a jelly roll structure.

In more detail, the electrode assembly 110 includes the positive electrode plate 111 coated with a positive electrode active material, the negative electrode plate 112 coated with a negative electrode active material, and the separator 113 positioned between the positive electrode plate 111 and the negative electrode plate 112 to prevent an electric short therebetween while allowing lithium ions to move. Here, the positive electrode plate 111 may include an aluminum (Al) foil, the negative electrode plate 112 may include a copper (Cu) foil, and the separator 113 may include polyethylene (PE) or polypropylene (PP). However, the described technology is not limited thereto. In addition, a first electrode tab 114 protrudes upward by a predetermined length and is electrically connected to the positive electrode plate 111. A second electrode tab 115 protrudes upward by a predetermined length and is electrically connected to the negative electrode plate 112. The first electrode tab 114 may include aluminum (Al), and the second electrode tab 115 may include nickel (Ni), but the described technology is not limited thereto. In addition, the polarities of the first and second electrode tabs 114 and 115 may be reversed optionally by one skilled in the art.

The case 120 has a top opening 120a having an open top portion and is shaped like a substantially rectangular parallelepiped. That is to say, the case 120 has a pair of long side portions 121 spaced a predetermined distance apart from each other and having relatively large areas, a pair of short side portions 122 having smaller areas than the pair of long side portions 121, and a bottom portion formed on a bottom of the long side portions 121 and the short side portions 122 to be substantially perpendicular to the long side portions 121 and the short side portions 122.

The case 120 can be formed by a deep drawing method so that the long side portions 121, the short side portions 122 and the bottom portion are integrally formed. Here, the case 120 may be formed of one material selected from the group of steel, aluminum and equivalents thereof, but is not limited thereto.

An electrolytic solution (not shown) and the electrode assembly 110 are accommodated or housed in the case 120. The electrolyte may serves as a movement medium for lithium ions generated by electrochemical reactions occurring in the positive and negative electrode plates 111 and 112 during charging and discharging of the secondary battery 100. The electrolytic solution may be a non-aqueous organic electrolyte including a lithium salt and a high-purity organic solvent mixed therein. In addition, the electrolyte may be a polymer using a polymeric electrolyte.

The cap assembly 130 includes a cap plate 140, an insulation plate 150, a terminal plate 160 and an electrode terminal 170. The cap assembly 130 is connected to a separate insulation case 180 and is attached to the top opening 120a of the case 120 to seal the case 120.

The cap plate 140 is formed of a metal plate sized and shaped to correspond to the top opening 120a of the can 120. The first electrode tab 114 of the electrode assembly 110 passes through the insulation case 180 and can be welded to a bottom surface of the cap plate 140. Thus, the cap plate 140 has the same polarity as the first electrode tab 114 of the electrode assembly 110.

A terminal through hole or cap through hole 141 is formed between top and bottom surfaces of the cap plate 140 and is substantially centrally located within the cap plate 140. An electrode terminal 170 is inserted into the terminal through hole 141 and connected to the terminal through hole 141. A tubular gasket 143 is mounted on an inner surface of the terminal through hole 141 to electrically insulate the electrode terminal 170 from the cap plate 140. The gasket 143 is interposed between the terminal through hole 141 and the electrode terminal 170, makes close contact therewith and electrically isolates the electrode terminal 170 and the cap plate 140 from each other. Thus, the terminal through hole 141 of the cap plate 140 may be sized to correspond to the outer diameter of the gasket 143.

An electrolyte injection hole 142 may further be provided at one side of the cap plate 140. The electrolyte injection hole 142 enables the injection of an electrolytic solution into an inner space of the case 120 after the cap assembly 130 is assembled with the top opening 120a of the case 120. In addition, the electrolyte injection hole 142 is sealed by a plug 144 after the electrolytic solution is injected into the case 120.

The insulation plate 150 can be formed of an electrically insulating material and is interposed between the cap plate 140 and the terminal plate 160 to electrically insulate the cap plate 140 and the terminal plate 160 from each other. The insulation plate 150 has a terminal through hole or insulation through hole 151 located to correspond to the terminal through hole 141 of the cap plate 140 to allow the electrode terminal 170 to be inserted into the terminal through hole 151. The electrode terminal 170 is inserted into the terminal through hole 151 of the insulation plate 150 and is connected to the insulation plate 150. A gasket 143 may further be provided between the terminal through hole 151 of the insulation plate 150 and the electrode terminal 170. In addition, the terminal through hole 151 of the insulation plate 150 may be sized to correspond to an outer diameter of the gasket 143. That is to say, the terminal through hole 151 of the insulation plate 150 may be sized to correspond to the terminal through hole 141 of the cap plate 140.

The terminal plate 160 may be formed of a metal plate configured such that its top surface 160a makes close contact with a bottom surface of the insulation plate 150. A bottom surface 160b of the terminal plate 160 faces a top surface of the insulation case 180. Thus, the terminal plate 160 is interposed between the insulation plate 150 and the insulation case 180. The top surface 160a of the terminal plate 160 can have, for example, a smaller area than the bottom surface of the insulation plate 150. The terminal plate 160 is electrically isolated from the cap plate 140 by the insulation plate 150. The bottom surface 160b of the terminal plate 160 can be welded to the second electrode tab 115 of the electrode assembly 110 having passed through the insulation case 180, so that the terminal plate 160 and the electrode assembly 110 have the same polarity.

The terminal plate 160 has a terminal through hole 161 formed between the top surface 160a and the bottom surface 160b and the electrode terminal 170 is inserted into the terminal through hole 161 and electrically connected to the terminal through hole 161. The terminal through hole 161 of the terminal plate 160 is located to correspond to the terminal through hole 141 of the cap plate 140.

The terminal through hole 161 includes a first terminal through hole or upper section 161a extending from the top surface 160a toward the bottom surface 160b of the terminal plate 160 and a second terminal through hole or lower section 161b extending from the bottom surface 160b toward the top surface 160a of the terminal plate 160. The first terminal through hole 161a has a first inner diameter a, the second terminal through hole 161b has a second inner diameter b, and the first inner diameter a is less than the second inner diameter b. Thus, the first terminal through hole 161a formed on the top surface 160a of the terminal plate 160 and the second terminal through hole 161b formed on the bottom surface 160b of the terminal plate 160 have different shapes and/or sizes.

In addition, the central axes of the first and second terminal through holes 161a and 161b are positioned on the same line and thus, the first and second terminal through holes 161a and 161b are concentric. Therefore, the terminal through hole 161 formed at least one step due to the difference in diameter between the first and second terminal through holes 161a and 161b.

A lower region of the electrode terminal 170 passes through the first terminal through hole 161a of the terminal plate 160 and makes close contact with the terminal plate 160 through the bottom surface of the second terminal through hole 161b. Accordingly, the terminal plate 160 is electrically connected to the electrode terminal 170.

In order to make contact with an outer circumferential surface of the electrode terminal 170, the first terminal through hole 161a may be a circular hole having substantially the same shape as the body of the electrode terminal 170. The second terminal through hole 161b may have substantially the same circular shape with the first terminal through hole 161a. Alternatively, the second terminal through hole 161b may have a substantially polygonal shape, such as that of a rectangle.

The electrode terminal 170 is inserted into terminal through holes 141, 151 and 161 of the cap plate 140, the insulation plate 150 and the terminal plate 160 to pass through the terminal through holes 141, 151 and 161. The electrode terminal 170 may be formed of a metal plate having a substantially cylindrical shape.

The electrode terminal 170 includes a head part 171 and an extension part 172 each horizontally extending a predetermined length from a top surface of the cap plate 140. The electrode terminal 170 also includes a first insertion part or body 173 and a second insertion part or tail 174 each having a substantially cylindrical shape and inserted into the terminal through holes 141, 151 and 161 of the cap plate 140, the insulation plate 150 and the terminal plate 160. The head part 171 and the extension part 172 of the electrode terminal 170 are electrically isolated from the top surface of the cap plate 140 by the gasket 143. The electrode terminal 170 is inserted into the terminal through hole 161 of the terminal plate 160 to make contact with the terminal plate 160, so that the electrode terminal 170 has the same polarity as the second electrode tab 115 electrically connected to the terminal plate 160.

The head part 171 horizontally extends. In addition, the plate part 171 is a region exposed to the outside of the secondary battery 100 and functions as an electrode having the same polarity with the second electrode tab 115 in a final structure.

The extension part 172 is formed to be substantially parallel to the head part 171 and may have a length that is less than that of the head part 171. The extension part 172 can efficiently prevent moisture from penetrating into the secondary battery 100 and the electrolytic solution from leaking out of the secondary battery 100 by increasing the contact area between the extension part 172 and the gasket 143.

The first insertion part 173 has a substantially cylindrical shape and protrudes downward from the extension part 172. The first insertion part 173 is formed to have a first length h1 and a first thickness 11 and passes through the terminal through hole 141 of the cap plate 140 and the terminal through hole 151 of the insulation plate 150. In addition, since the exterior surface of the first insertion part 173 is wrapped by the gasket 143, the cap plate 140 and the first electrode tab 114 are electrically insulated from each other.

The first insertion part 173 is formed such that its bottom end 173a is rounded having a first curvature radius r1. Here, the first curvature radius r1 may be about 0.01 mm or greater. When the first curvature radius r1 is about 0.01 mm, it is possible to prevent cracks from being generated in the terminal plate 160 when the first insertion part 173 is inserted into the terminal through hole of the terminal plate 160 by spinning. However, an upper limit of the first curvature radius r1 is not specifically preset because it is advantageous to set the first curvature radius r1 to be larger in order to prevent cracks from being generated. However, in other embodiments, the first curvature radius r1 is less than about 0.01 mm.

The second insertion part 174 has a substantially cylindrical shape and extends from a bottom end of the first insertion part 172. The second insertion part 174 is formed to have substantially the same center as the first insertion part 174 so as to facilitate insertion of the electrode terminal 170 by spinning. The second insertion part 174 has a second length h2 and a second thickness 12.

Here, the second length h2 of the second insertion part 174 extending from the end of the second insertion part 174 connected to the first insertion part 173 may be about 0.1 mm or greater. When the second length h2 of the second insertion part 174 is greater than or substantially equal to about 0.1 mm, the second insertion part 174 may spread out by being rotated in a spinning process for being connected to the terminal plate 160. Accordingly, the second insertion part 174 can be deformed such that it makes contact with the second terminal through hole 161b having the second inner diameter b. In addition, contact resistance between the second insertion part 174 and the terminal plate 160 can be reduced by increasing the contact area between the deformed second insertion part 174 and the second terminal through hole 161b of the terminal plate 160. However, the upper limit of the second length h2 is not specifically preset because it is advantageous to set the second length h2 of the second insertion part 174 to be greater in order to reduce the contact resistance. However, in other embodiments, the second length h2 may be less than about 0.1 mm.

The second thickness 12 of the second insertion part 174 is less than the first thickness 11 of the first insertion part 173. Here, the second thickness 12 may be greater than or substantially equal to about 0.05 mm. When the first insertion part 173 has various thicknesses, the second insertion part 174 may have a cross-sectional area set to be greater than or substantially equal to about 20% of the cross-sectional area of the first insertion part 173. Generally, when the second thickness 12 is greater than or substantially equal to about 0.05 mm, the second insertion part 174 may sufficiently spread out in a spinning process to then make contact with the second terminal through hole 161b having the second inner diameter b. In addition, if the cross-sectional area of the second insertion part 174 is greater than or substantially equal to about 20% of the cross-sectional area of the first insertion part 173, the second insertion part 174 may sufficiently spread out in the spinning process. However, in other embodiments, the second thickness 12 is less than about 0.05 mm and the cross-sectional area of the second insertion part 174 is less than about 20% of the cross-sectional area of the first insertion part 173.

In addition, the second thickness 12 of the second insertion part 174 may be about half (½) or less of the first thickness 11 of the first insertion part 173. In addition, when the second thickness 12 of the second insertion part 174 is less than or substantially equal to about half of the first thickness 11 of the first insertion part 173, a sufficiently low contact resistance between the second insertion part 174 and the terminal plate 160 can be obtained. However, in other embodiments, the second thickness 12 is greater than about half of the first thickness 11.

In addition, the bottom end 174a of the second insertion part 174 may be rounded to have a second curvature radius r2. The bottom end 174a of the second insertion part 174 can prevent the terminal plate 160 from being damaged in the spinning process. To this end, the second curvature radius r2 may be about 0.01 mm or greater. If the second curvature radius r2 is greater than or substantially equal to about 0.01 mm, the terminal plate 160 can be prevented from being damaged. Accordingly, the upper limit of the second curvature radius r2 is not specifically preset. However, in other embodiments, the second curvature radius r2 is less than about 0.01 mm.

Figure 4:
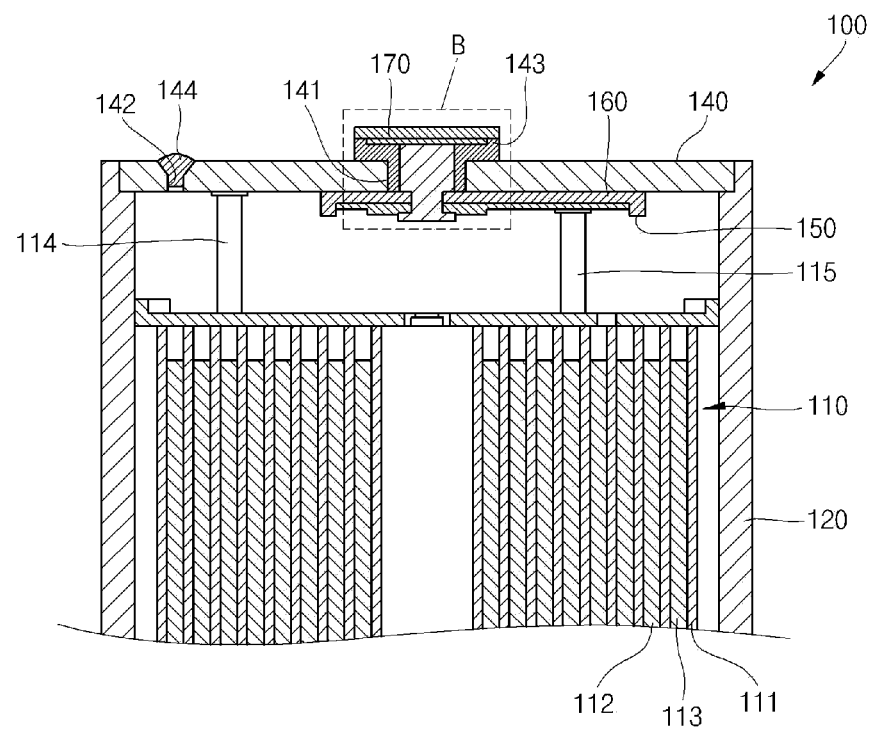
FIG. 4 is a cross-sectional view of the secondary battery shown in FIG. 1.
Figure 5:
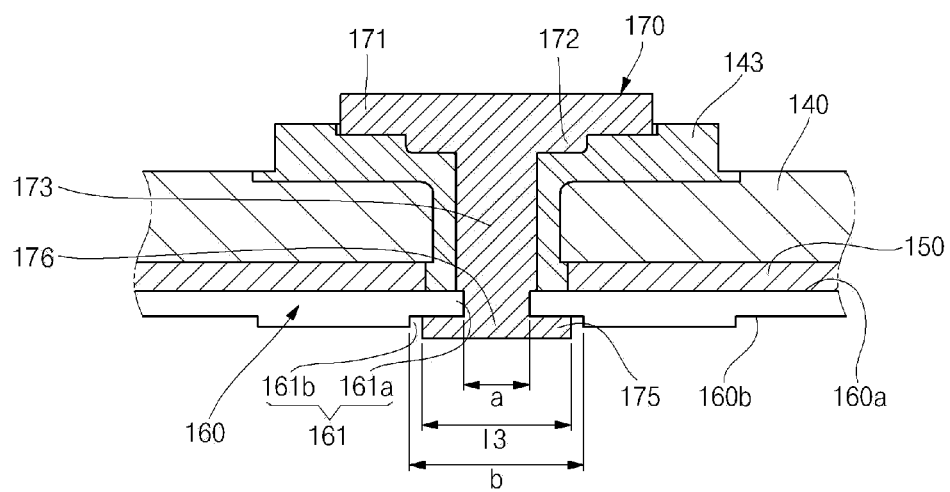
FIG. 5 is an enlarged view of a portion 'B' shown in FIG. 4.

Referring to FIGS. 4 and 5, the bottom of the second insertion part 174 is deformed by spinning to be connected to the bottom surface of the terminal plate 160. If the second insertion part 174 spreads out by spinning, it is connected to the bottom surface of the terminal plate 160. In particular, the second insertion part 174 spreads out along the second terminal through hole 161b of the terminal plate 160 to be connected to the terminal plate 160. Therefore, the bottom end 174a of the second insertion part 174 is electrically connected to the terminal plate 160. Here, the length 13 of the second insertion part 174 that is deformed and spread out is less than or substantially equal to the inner diameter of the second terminal through hole 161b. Therefore, the bottom end 174a of the second insertion part 174 may be stably connected to the second terminal through hole 161b. In one embodiment, the spinning of the electrode terminal is performed by a motor (not illustrated) at a speed that enables the material of the electrode terminal to be spread out.

Further, as shown in FIG. 5, after the second insertion part 174 is spread out it includes upper and lower ends 176 and 175 having different thicknesses. The upper end 176 has the second thickness 12 that substantially equals the first inner diameter a of the first terminal through hole 161a. The lower end 175 has the third thickness or length 13 that is less than or substantially equal to the second inner diameter b.

With reference back to FIG. 1, the insulation case 180 is formed of an electrically insulating material and is interposed between the cap assembly 130 and the electrode assembly 110 to electrically insulate the cap assembly 130 and the electrode assembly 110 from each other. In addition, the insulation case 180 includes a pair of tab holes to allow the first electrode tab 114 and the second electrode tab 115 of the cap assembly 130 to upwardly protrude therethrough. Thus, the insulation case 180 electrically insulates a top end of electrode assembly 110, from which the first electrode tab 114 and the second electrode tab 115 of the electrode assembly 110 protrude, and the cap assembly 130 from each other.

Although exemplary embodiments of the inventive technology have been described in detail hereinabove, it should be understood that many variations and modifications of the described inventive technology, which may be apparent to those skilled in the art, will still fall within the spirit and scope of the present invention as defined by the appended claims.

What is claimed is:

1. A secondary battery, comprising:
an electrode assembly including a first electrode plate, a second electrode plate and a separator;
a case having an opening and housing the electrode assembly and an electrolytic solution; and
a cap assembly including a cap plate, an insulation plate, a terminal plate and an electrode terminal, wherein the cap assembly seals the opening,
wherein the electrode terminal includes a body having a first thickness and a tail, wherein the tail has an upper end,
wherein at least a portion of the tail of the electrode terminal has a second thickness that is less than the first thickness,
wherein the body of the electrode terminal has a bottom end and a top end, wherein the top end extends beyond a lower surface of the cap plate, wherein the thickness at the top end of the body and the thickness at the bottom end of the body are the same as the first thickness, and wherein the bottom end of the body directly contacts the upper end of the tail,
wherein the terminal plate has a terminal through hole extending from a top surface to a bottom surface thereof, wherein the upper end of the tail is located within the terminal through hole,
wherein the terminal through hole has a first diameter which is less than the first thickness and a second diameter which is greater than the first diameter; and
wherein the insulation plate is interposed between the cap plate and the terminal plate and in direct contact with the top surface of the terminal plate.

2. The secondary battery of claim 1, wherein the electrode terminal is electrically connected to the terminal plate, wherein the tail has a lower end, wherein the upper end of the tail has the second thickness and wherein the lower end of the tail has a third thickness that is greater than the second thickness.

3. The secondary battery of claim 2, wherein the body of the electrode terminal has a first length, wherein the tail of the electrode terminal has a second length and wherein the second length is less than the first length.

4. The secondary battery of claim 3, wherein the upper end of the tail of the electrode terminal has a cross-sectional area that is greater than or substantially equal to about 20% of the cross-sectional area of the body of the electrode terminal.

5. The secondary battery of claim 1, wherein the terminal through hole has the first diameter at the top surface of the terminal plate and the second diameter at the bottom surface of the terminal plate.

6. The secondary battery of claim 1, wherein the tail of the electrode terminal at least partially fills the portion of the terminal through hole having the second diameter.

7. The secondary battery of claim 1, wherein the bottom end of the body of the electrode terminal is connected to the tail of the electrode terminal at a junction, a cross-section of the junction defining a rounded edge.

8. The secondary battery of claim 1, wherein the electrode terminal further includes a head part located at the top end of the body having a fourth thickness that is greater than the first thickness.

9. The secondary battery of claim 8, wherein the electrode terminal further includes an extension part having a fifth thickness that is greater than the first thickness and less than the fourth thickness and wherein the extension part is interposed between the head part and the top end of the body of the electrode terminal.

10. The secondary battery of claim 7, wherein the rounded edge of the junction has a first curvature radius that is greater than or substantially equal to about 0.1 mm.

11. The secondary battery of claim 1, further comprising a gasket interposed between and in direct contact with the body of the electrode terminal and the cap plate.

* * * * *